(12) United States Patent
Keith (10) Patent No.: US 10,606,079 B1
(45) Date of Patent: Mar. 31, 2020

(54) IMAGE INTEGRITY MONITORING SYSTEMS AND METHODS FOR LIGHT PROCESSING BASED HEAD UP DISPLAYS

(71) Applicant: Rockwell Collins, Inc., Cedar Rapids, IA (US)

(72) Inventor: Christopher A. Keith, Wilsonville, OR (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 92 days.

(21) Appl. No.: 15/615,684

(22) Filed: Jun. 6, 2017

(51) Int. Cl.
*G06K 9/00* (2006.01)
*G02B 27/01* (2006.01)

(52) U.S. Cl.
CPC ..... *G02B 27/0172* (2013.01); *G02B 27/0101* (2013.01); *G02B 2027/012* (2013.01); *G02B 2027/014* (2013.01); *G02B 2027/0138* (2013.01)

(58) Field of Classification Search
CPC combination set(s) only.
See application file for complete search history.

(56) References Cited

U.S. PATENT DOCUMENTS

| | | | |
|---|---|---|---|
| 6,587,597 B1 * | 7/2003 | Nakao | H04N 5/232 348/139 |
| 2013/0293591 A1 * | 11/2013 | Miller | G09G 3/02 345/690 |
| 2016/0350929 A1 * | 12/2016 | Tubic | G01B 11/25 |

* cited by examiner

*Primary Examiner* — Alex Kok S Liew
(74) *Attorney, Agent, or Firm* — Donna M. Suchy; Daniel M. Barbieri (57) ABSTRACT

A head up display HUD can be a worn display, a helmet mounted display (HMD, or other display system. The HUD includes a projector including a light processor. The projector provides light to a projector path and a dump path. The HUD also includes a camera disposed to capture the light in the dump path and a processor. The processor is configured to process image data from the camera and image data associated with the light in the projection path to determine an error.

20 Claims, 5 Drawing Sheets

IMAGE INTEGRITY MONITORING SYSTEMS AND METHODS FOR LIGHT PROCESSING BASED HEAD UP DISPLAYS

BACKGROUND

Embodiments of the inventive concepts disclosed herein relate generally to the field of displays. Embodiments of the inventive concepts disclosed herein more specifically relate to integrity monitoring for head up displays (HUDs), including but not limited to, head worn displays (HWDs), fixed HUDs, near eye displays, and helmet mounted displays (HMDs).

HUDs provide information that is viewable in virtual space for the operation of equipment, such as aircraft, ships, boats, naval crafts, medical equipment, robotic equipment, remote vehicles, unmanned vehicle systems ("UVS"), training simulators, entertainment systems, military equipment, land vehicles, etc. The information can include navigation parameters, guidance parameters, equipment parameters, location information, video information, target information, remote views, symbology, etc.

HUDs can be used to overlay display symbology (e.g., one or more symbols) onto scenes viewable out of a window or other port. The symbols are intended to represent or enhance features in the view of the user and are projected by a projector to a combiner. Assurance that information presented on a combiner is correctly presented and correctly overlays the corresponding real world features is desirable. For example, display functions can be monitored and redundant aircraft sensors can be utilized in HUD to ensure that symbols are properly positioned on the combiner.

SUMMARY

In one aspect, embodiments of the inventive concepts disclosed herein are directed to a HUD. The HUD can be a worn display, an HMD, an HWD, a fixed HUD, a near eye display, etc. The HUD includes a projector including a light processor. The projector provides light to a projector path and a dump path. The HUD also includes a camera disposed to capture the light in the dump path and an electronic processor. The electronic processor is configured to process image data from the camera and image data associated with the light in the projection path to determine an error.

In a further aspect, embodiments of the inventive concepts disclosed herein are directed to a method of monitoring integrity of an image provided on a combiner of a HUD. The method includes providing light from a light processor to a dump path, capturing the light and providing electronic image data. The method also includes using the electronic image data to determine an error associated with the image provided on the combiner.

In a further aspect, embodiments of the inventive concepts disclosed herein are directed to a method. The method is used in a HUD that provides symbology on a combiner. The method includes projecting light to a combiner and to a camera in response to electronic drive image data provided to a micro-mirror assembly, and providing camera image data in response to the light provided to the camera. The method also includes processing the camera image data and the electronic drive image data to determine an error associated with the micro-mirror assembly.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

HUDs have been proposed that include light processing-based projectors, such as, projectors using a digital light processing (DLP) chip. The DLP chip can include a micro-mirror array, such as, a digital micro-mirror device (DMD). Each micro-mirror in the array represents one or more pixels in the projected image. The micro-mirrors can be repositioned rapidly from an on position to reflect light through a projection path to the combiner or to an off position to reflect light to a sink path (e.g., a light dump). Gray scales for each pixel are provided by controlling the on-off time of each micro-mirror.

Systems and methods according to the inventive concepts disclosed herein are configured to detect a failure in the DLP-based projector or drive electronics associated therewith by comparing an image in the projection path with an image in the sink or dump path. When operating properly, a camera image of the light in the dump path is an inverse of the image provided on the combiner. In some embodiments, a comparative analysis between the on state image data generated electronically and the off state image data captured optically by the camera detects if the display has failed either at the DLP level or in the drive electronics. In some embodiments, the systems and methods blank the display on the combiner in response to a detected error, thereby preventing the user from potentially being provided misleading information. In some embodiments, the systems and methods provide an indication of defective pixels or portions of the image on the combiner, thereby allowing the remaining portions or pixels to be used.

Figure 1:
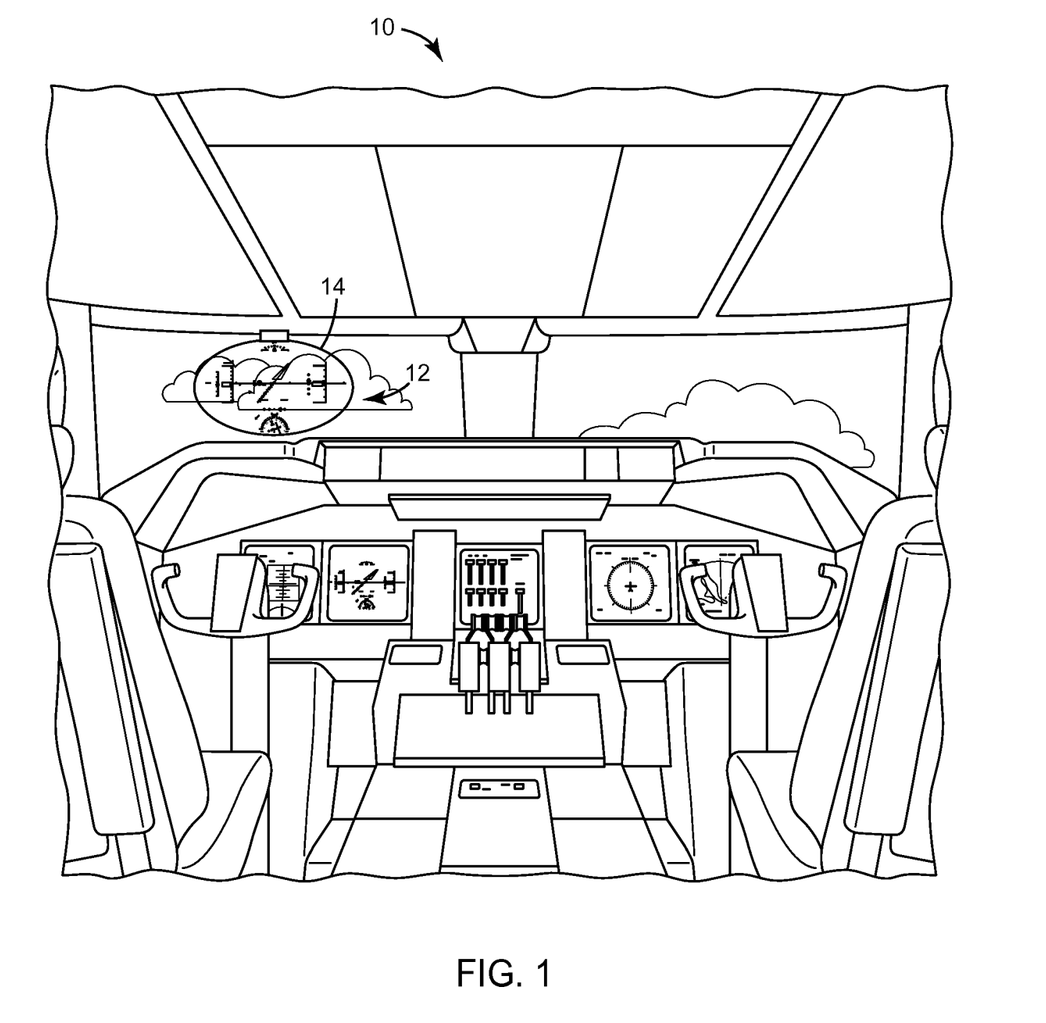
FIG. 1 is a schematic illustration of an aircraft control center including an exemplary embodiment of a HUD in accordance with the inventive concepts disclosed herein.

Referring now to FIG. 1, an illustration an aircraft control center 10 or cockpit is shown, according to some embodiments. The aircraft control center 10 includes a HUD 12. Although shown as a fixed HUD 12, the HUD 12 can be an HMD system, an eyewear mounted display system, an HWD system, a near eye display system or other worn display device.

The HUD 12 can be used to provide information to the flight crew, thereby increasing visual range and enhancing decision-making abilities. In some embodiments, the HUD 12 provides HUD symbology, a weather display, a joint display, a weather radar map, a terrain display, images from a synthetic vision system (SVS), and images from an enhanced vision system (EVS) (e.g., an enhanced flight vision system EFVS). The HUD 12 can be utilized in various applications including but not limited to aviation, medical, naval, targeting, ground-based vehicle, military, remote control, etc. In some embodiments, HUD 12 is used in a cockpit, bridge, operating room, etc. In some embodiments, the HUD 12 is a monochrome system or a two-color system or a multicolor system.

The HUD 12 includes a combiner 14. In some embodiments, the combiner 14 is provided as part of a wearable HUD. In some embodiments, the combiner 14 can be a substrate waveguide including diffractive gratings, a reflective combiner or holographic combiner. The combiner 14 is a translucent or transparent combiner for viewing the real world scene through main surfaces of the combiner 14 in some embodiments. The combiner 14 can be any medium for providing an image.

Figure 2:
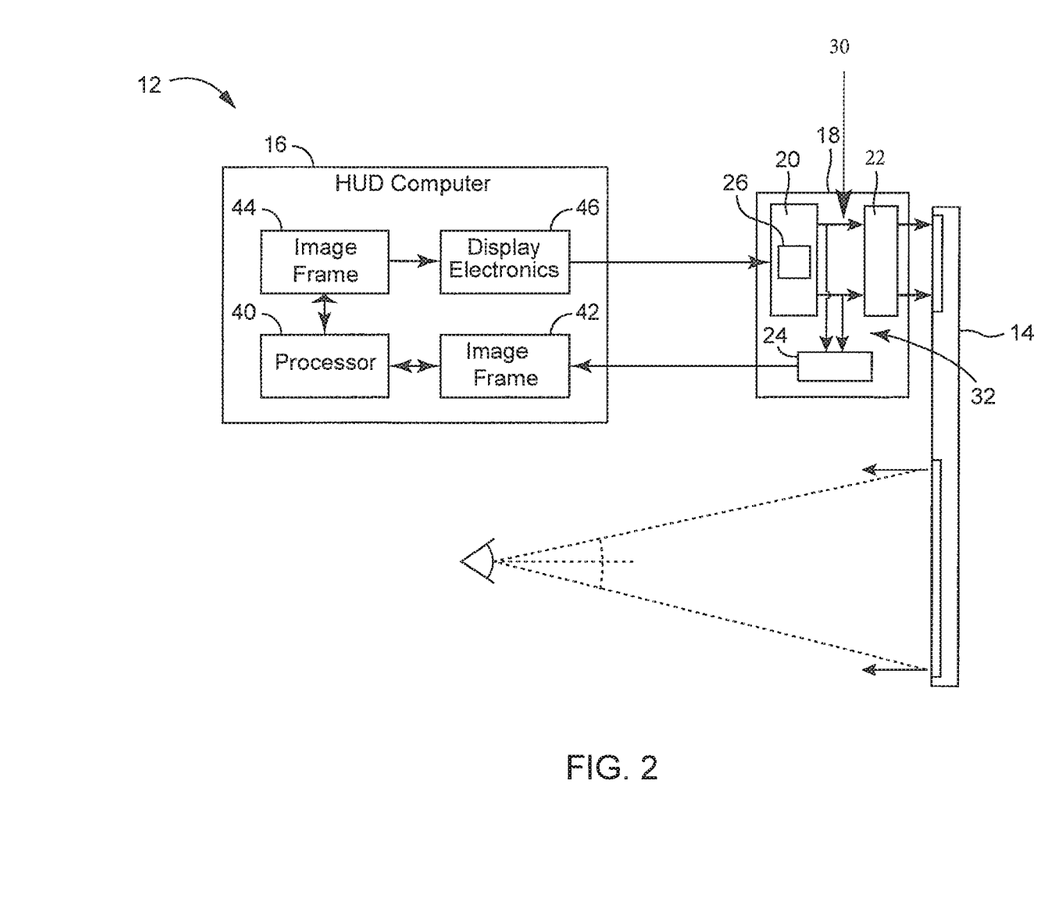
FIG. 2 is a schematic general block diagram of the HUD illustrated in FIG. 1.

With reference to FIG. 2, the HUD 12 includes the combiner 14, a HUD computer 16, and a projector 18. The projector 18 and combiner 14 can be packaged for use in small volume displays, such as HMDs and other worn displays.

The HUD computer 16 includes a processor 40, an image frame memory 42, an image frame memory 44 and drive electronics 46. The HUD computer 16 provides an image frame stored in the image frame memory 44 for an image to be provided on the combiner 14. The image frame is associated with a desired image as determined by the HUD computer 16 based upon pilot selections, sensor inputs, HUD processing software and other information. The image frame memory 44 stores a camera frame from the camera 24 as discussed in more detail below.

The image frame stored in the image frame memory 44 is provided to drive electronics 46, which provide drive signals to the light processor 26 to control the micro-mirrors such that the appropriate image is provided to the combiner 14. The image frame data is stored for an amount of time after the display electronics 46 provides the drive signals to the projector 18. Storage of the image frame for the additional time is performed so that the processor 40 can compare the camera image frame stored in the image frame memory 42 to the image frame provided to the drive electronics 46. This allows the camera image frame to be compared to what is intended to be displayed on the combiner 14. The image frame data and the camera frame data are time stamped in some embodiments. The time stamps are used to ensure the correct image and camera frames are being compared for errors.

The drive electronics 46 controls the duty cycle or on/off times of micro-mirrors in the light processor 26 for grey scales in some embodiments. The HUD computer 16 may also provide image data to the projector 18 and the projector 18 may provide drive signals in response to the image data so that the projector 18 provides the image on the combiner 14. The processor 40 is configured to detect an error by processing the image frames stored in the memories 42 and 44 as described below with reference to FIG. 3. Image frame memories 42 and 44 are any storage devices for storing data associated with providing an image.

The projector 18 includes a light processor based image source 20, collimating optics 22, and a camera 24. The image source 20 provides the optical image which is collimated by the collimating optics 22 for display on the combiner 14.

The image source 20 includes a light processor 26, such as a DLP chip. The DLP chip includes a micro-mirror assembly in some embodiments. The collimating optics 22 are disposed between the combiner 14 and the image source 20. The collimating optics 22 can be a single optical component, such as a lens, or include multiple optical components. In some embodiments, the collimating optics 22 are configured as a catadioptric collimator as described with reference to FIG. 4. The collimating optics 22 are integrated with or spaced apart from image source 20 and/or combiner 14 in some embodiments.

Light in accordance with the image from the light processor 26 is provided to a projection path 30 to the combiner 14. The projection path 30 can traverse the collimating optics 22. Light that is not included in the image is provided to a dump path 32 where it is received by the camera 24. The camera 24 captures an image frame of the light in the dump path 32 and provides the image frame to the HUD computer 16. The camera 24 is focused on the micro-mirror plane of the light processor 26 in some embodiments. The light in the dump path 32 is associated with light striking micro-mirrors in the light processor 26 that are in the off state, and the light in the projection path 30 is associated with light striking the micro-mirrors in the light processor 26 that are in the on state in some embodiments.

The camera 24 provides the image frame of the light in the dump path 32 for storage in the image frame memory 42. In some embodiments, the camera 24 is placed in the dump path 32 where there is sufficient room even if the projector 18k has a compact design. The camera 24 can be attached to a housing associated with the projector 18a so that its aperture captures the light in the dump path 32.

The camera 24 is any type of device for converting optical energy into electronic data. The camera 24 can be a visible light camera having a photosensitive array. In some embodiments, an additional camera can capture an image of the combiner 14 or an image of the light in the projection path 30 and that image can be used to compare with the image captured by the camera 24. In some embodiments, the image of the light in the dump path 32 and the image of the light from the combiner 14 are compared using the known alignment of the camera 24 and the additional camera. If these two cameras are known in their alignment, any errors in the optical path of the collimator/projector/combiner can be monitored as well. If there is a drift in the optomechanical structure of the HUD 12 adding a temporal or thermal base error, the processor 40 can implement corrections via a feedback loop to calculate an error correction to feed back into the display electronics 46.

Figure 3:
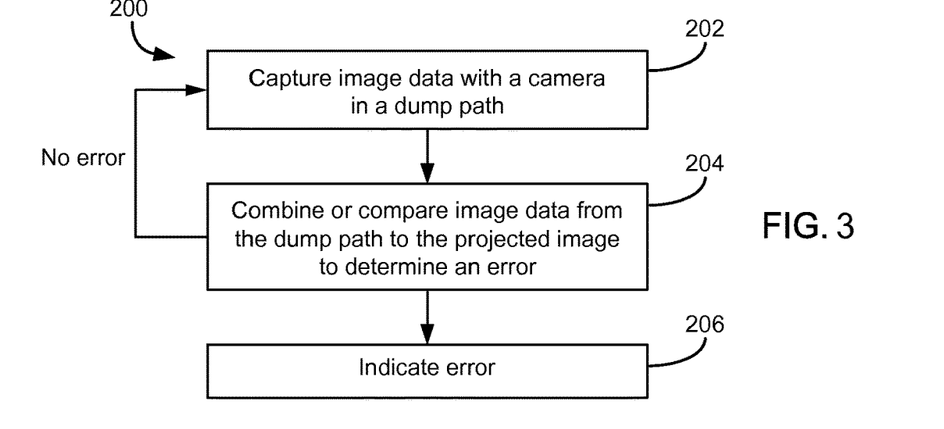
FIG. 3 is a flow diagram for an integrity check flow for the HUD illustrated in FIG. 2 in accordance with some exemplary embodiments of the inventive concepts disclosed herein.

With reference to FIGS. 2 and 3, a flow 200 can be used by the HUD 12 to determine an error associated with the projector 18. At an operation 202, the camera 24 captures the image in the dump path 32. At an operation 204, the processor 40 combines or compares the image data from the dump path 32 to the image data associated with the image provided to the projection path 30 to detect an error. If an error is not detected, the flow 200 returns to the operation 202. If an error is detected, the flow 200 advances to an operation 206.

In some embodiments, the processor 40 is configured to add the image frames together such that a combined image frame of a consistent level is indicative of an absence of errors. If the combined image frame includes an image or pixels that are not consistent with neighboring pixels, those pixels are in error in some embodiments. A video processing routine or filter can be used to detect the inconsistency among the pixels in some embodiments. In some embodiments, one of the image frames in image frame memories 42 and 44 can be inversed and compared to determine if there is an error. The inversion should result in identical image frames. A matching algorithm can be used to determine if the frames are identical.

At the operation 206 and after detection of an error, the processor 40 blanks the display on the combiner 14 by changing the image frame provided to the drive electronics 46 in response to the error in some embodiments. ] At the operation 206 and after detection of an error, the processor 40 provides an error message or symbol to the combiner 14 that indicates an error has been detected in some embodiments (e.g., by providing such information to the image frame stored in image frame memory 44 at a location not affected by the error). In some embodiments, blanking the display is achieved by displaying a completely black image via the light processor 26 or by turning off illumination light provided to the light processor 26. In some embodiments, the processor 40 can provide an indication of the error and the location of the error so that the remaining portions of the image on the combiner 14 can be used. At the operation 206 and after detection of an error, the processor 40 provides symbology at portions of the image on the combiner 14 that have not been affected by the error (e.g., by providing such symbology to the image frame stored in image frame memory 44 and not providing any symbology for the portions of the image affected by the error). In such embodiments, the flow can return to the operation 202.

In some embodiments, the processor 40 determines the portions of the image on the combiner 14 (FIG. 1) that are in error and determines whether those portions are critical. If critical information is not being displayed properly, the processor 40 can blank the entire image. However, if the portion that is in error does not contain critical information, highlighting or other warnings can be provided. In some embodiments, if critical information is subject to an error, the critical information is moved to another portion of the micro-mirror array that is not experiencing an error, if possible.

In some embodiments, a timing reference circuit is used to ensure that the image data from the camera 24 is a temporal match with the image data in the image frame memory 44. In addition, the processor 40 can provide scaling and other calibration adjustments to the data in the image frames in the memories 42 and 44 before comparison or combination to ensure that the light in the dump path 32 is properly compared to the light in the projection path 30. For example, compensation can be provided for sensing levels associated with the camera 24.

In a two-color system, two image sources 20 can be included in the projector 18, or the projector 18 can provide image frames sequentially, one for each color. Similarly, in a three or more color system, three or more image sources 20 can be utilized or image frames can be provided sequentially for each color. The camera 24 can capture each image for each color so that processor 40 can compare images in the projection path 30 and the dump path 32 for each color to detect errors for each color. In some embodiments, a single image source 20 is used and different color frames are written sequentially and the light source illuminating the DLP of the light projector 26 is pulsed appropriately. The camera 24 can be a monochrome camera and uses timing signals to determine which color image is being captured. In some embodiments, the camera 24 is a color camera that can be used to detect which color image is being detected.

Figure 4:
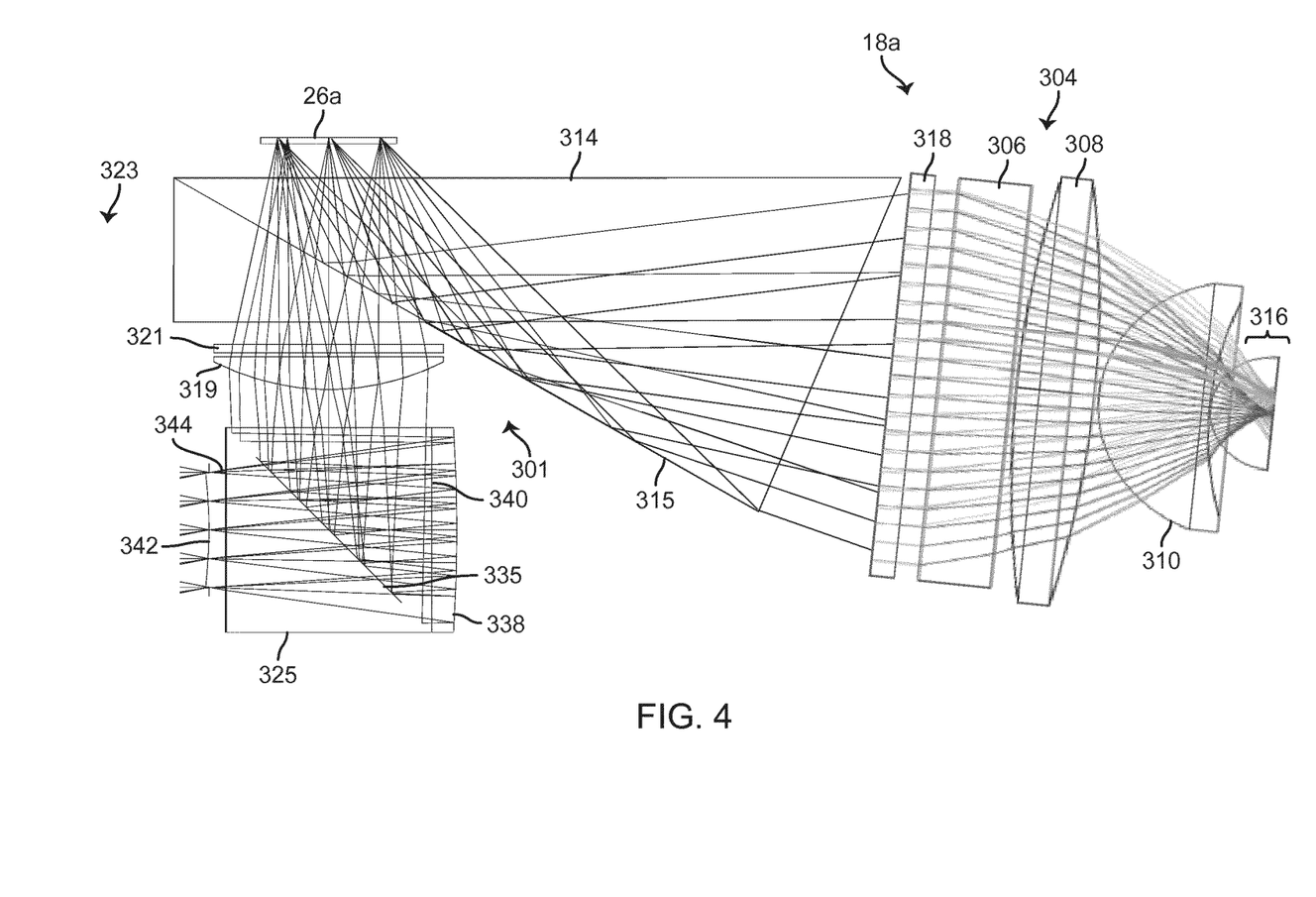
FIG. 4 is a side view schematic drawing of an exemplary embodiment of a projector for the HUD illustrated in FIG. 2.

With reference to FIG. 4, a projector 18a may be implemented similarly to the projector 18 in the HUD 12 (FIG. 2). Other configurations of optical components different than the projector 18a can be used as the projector 18. In some embodiments, the projector 18a is configured for use in HMDs and worn displays and can be provided in a small package. In some embodiments, the projector 18 (FIG. 2) is a larger projector for use with fixed HUDs.

The projector 18a includes collimating optics 301, a light processor 26a, such as, a micro electro mechanical system (MEMS) display which is an example of the light processor 26, and an illuminator 304. The illuminator 304 includes a Fresnel lens 306, a convex lens 308, dome lens 310, an LED 316, and a lens 318. The illuminator 304 also includes a prism 314 having a border 315. The collimating optics 301 includes a polarizing beam splitter 325, a polarizer 321, and a field lens 319. The polarizer 321 is disposed between the field lens 319 and the prism 314. The prism 314 is a fold element in some embodiments.

Light from the LED 316 is provided through the dome lens 310, the convex lens 308, the lens 306, and the lens 318 to the prism 314. The light in the prism 314 bounces off of the border 315 using total internal reflection to the light processor 26a. Alternatively, the border 315 can be a selectively reflective surface. The light from the MEMS display 302 is provided across the border 315 to the polarizer 321 and the field lens 319 to the polarizing beam splitter 325.

The image reflected off the light processor 26a is collimated by the collimating optics 301. An inverse image of the light provided to the collimating optics 301 is provided to a dump path or area 323. Light provided to the collimating optics 301 is provided to the polarizing beam splitter 325 and the light has a polarization such that the light that is reflected by a polarization sensitive reflective coating 335 of the polarizing beam splitter 325. The collimating optics 301 include the field lens 319, the polarizing beam splitter 325, a curved reflective element 338, a quarter wave retarder film 340, and a correcting lens 342. A half wave retarder film 344 is provided between correcting lens 342 and the polarizing beam splitter 325 in some embodiments.

Figure 5:
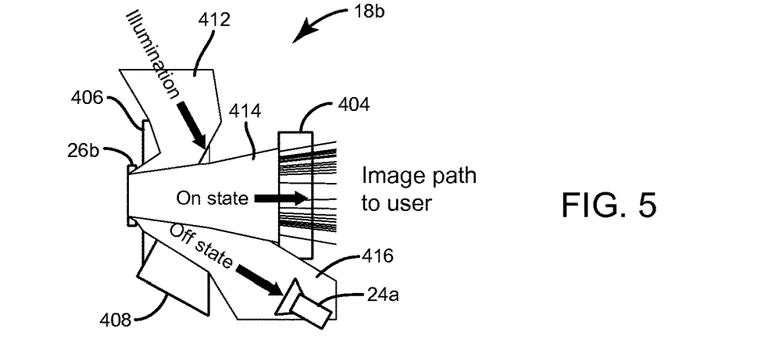
FIG. 5 is a side view schematic drawing of an exemplary embodiment of a projector for the HUD illustrated in FIG. 2 showing an illumination path, a projection path and a dump path in accordance with some exemplary embodiments of the inventive concepts disclosed herein.

With reference to FIG. 5, a projector 18b may be implemented similarly to the projector 18 in the HUD 12 (FIG. 2) and is a compact projector similar to the projector 18a (FIG. 4). The projector 18b includes a light processor 26b which is an example of the light processor 26 and is similar to the light processor 26a (FIG. 4), a collimation lens 404, a prism 406, and a prism 408. Illumination light is provided to an illumination path 412 through the prism 406 where it is reflected toward the light processor 26b. The light processor 24b reflects light with micro-mirrors in an on state to a projection path 414 and to a dump path 416 with micro-mirrors in an off state. The light in the projection path 414 is provided to a projection or collimation lens 404 for providing the image to the combiner 14 (FIG. 2).

The projection path 414 traverses portions of the prisms 406 and 408. The dump path 416 traverses portions of prisms 406 and 408. A camera 24a, an example of the camera 24 (FIG. 2), receives the light in the dump path 416. The camera 24a is focused to image the micro-mirror plane associated with the light processor 26b in some embodiments.

Figure 6:
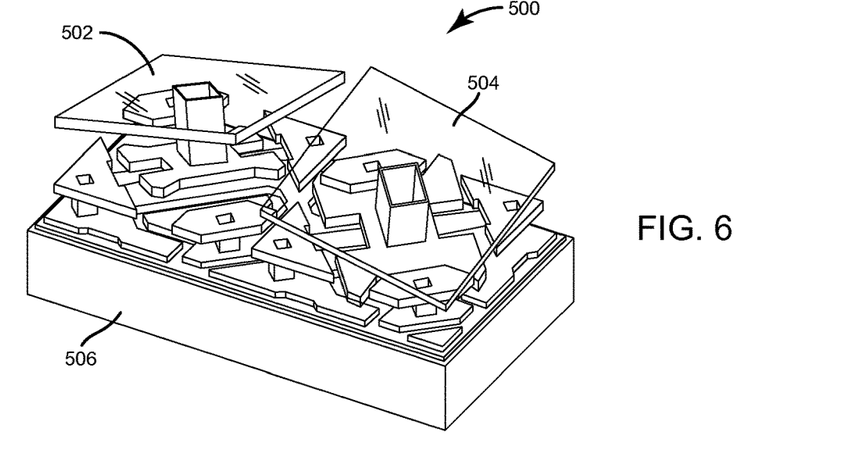
FIG. 6 is a perspective view schematic drawing of an exemplary portion of a digital light processing (DLP) chip for an exemplary projector for the HUD illustrated in FIG. 2 in accordance with the inventive concepts disclosed herein.

With reference to FIG. 6, a portion 500 of a light processor, such as, the light processors 26 (FIG. 2), 26a (FIG. 4), and 26b (FIG. 5) includes a micro-mirror 502 and a micro-mirror 504. The micro-mirrors 502 and 504 can be moved from an off state to an on state in response to the image frame in the memory 42 (FIG. 2). In some embodiments, the micro-mirror 504 is provided at a positive 10 degree angle in an on state, and the micro-mirror 502 is provided at a negative 10 degree angle in an off state. The micro-mirrors 502 and 504 are moved by electromechanical devices on a complementary metal oxide semiconductor (CMOS) substrate 506 in some embodiments. Configurations of the collimation or projector optics discussed with reference to FIGS. 4-6 are exemplary only and are not disclosed in a limiting fashion toward the inventive concepts disclosed herein. Aspects of the inventive concepts disclosed herein can be embodied in a HUD system using virtually any type of collimator or illuminator.

Figure 7:
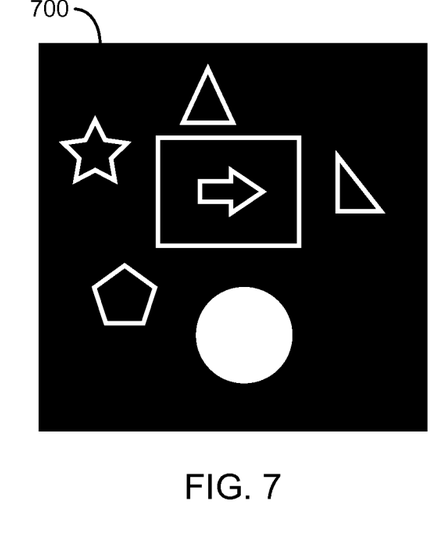
FIG. 7 an illustration of an exemplary image on a combiner of the HUD illustrated in FIG. 2 path in accordance with some exemplary embodiments of the inventive concepts disclosed herein.
Figure 8:
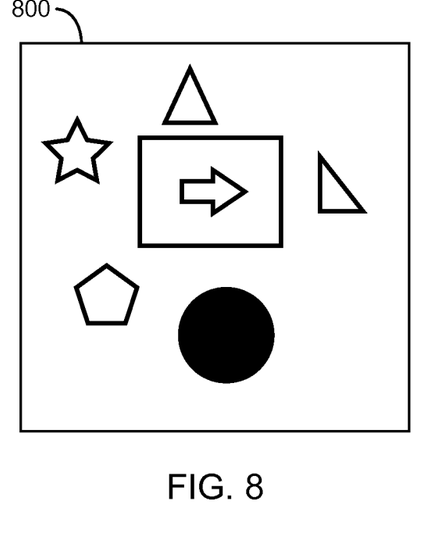
FIG. 8 is an illustration of an exemplary image received by a camera of the HUD illustrated in FIG. 2 path in accordance with some exemplary embodiments of the inventive concepts disclosed herein.

With reference to FIG. 7, an image 700 is provided on the combiner 14 (FIG. 1). The image 700 can include various symbols or information. With reference to FIG. 8, an image 800 represents the image provided in the dump path 32 when the image 700 is provided in the projection path 30 (FIG. 2).

Figure 9:
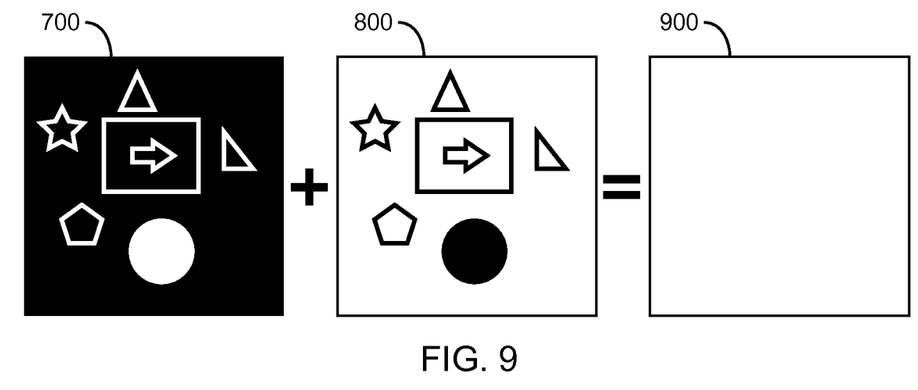
FIG. 9 is an illustration of a combination of the image illustrated in FIG. 7 and the image illustrated in FIG. 8 for the HUD illustrated in FIG. 2 showing no image errors path in accordance with some exemplary embodiments of the inventive concepts disclosed herein.

With reference to FIG. 9, an addition of the image 700 to the image 800 (with appropriate scaling in some embodiments) results in a consistent image 900, which is an indication of an absence of errors. For example, if images 700 and 800 are monochrome green images, image 900 will result in a green-only image of consistent intensity or grey scale.

Figure 10:
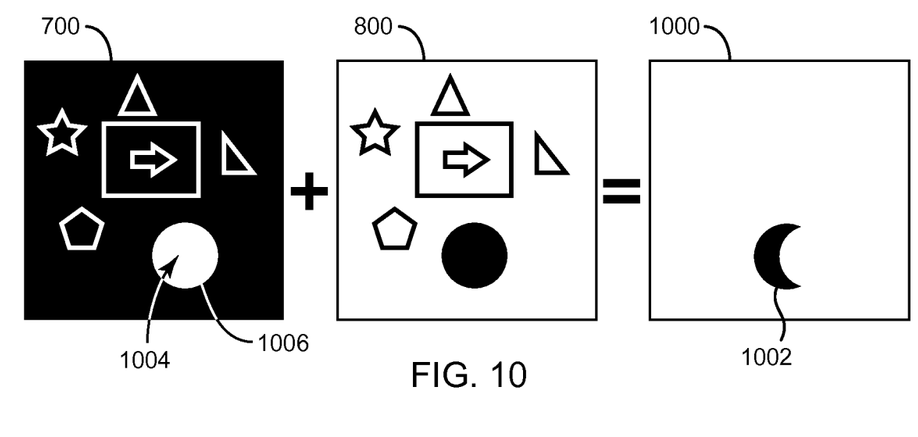
FIG. 10 is an illustration of showing a combination of the image illustrated in FIG. 7 and the image illustrated in FIG. 8 for the HUD illustrated in FIG. 2 showing an image error path in accordance with some exemplary embodiments of the inventive concepts disclosed herein.

With reference to FIG. 10, images 700 and 800 are added to form an image 1000. Due to an error, the image 1000 includes a portion 1002, which is not consistent with the remaining portion of the image 1000. Portion 1002 can indicate pixels or micro-mirrors that are not operating properly due to errors associated with the micro-mirrors or drive electronics associated therewith. The portion 1002 also indicates a placement of the error in HUD 12 (e.g., lower center of the image 700). The error in the image 700 as shown in the image 1000 can be due to s failure of pixels at an area 1004 or a shift in the placement of a symbol 1006 in the image 700.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A head up display (HUD), comprising: a projector comprising a light processor, the projector being configured to provide first light to a projection path and second light to a dump path, wherein the light processor comprises a matrix of reflective elements responsive to first image data and configured to provide a first image to the projection path and a second image to the dump path, the first image and the second image being two dimensional images and being related; a camera disposed to capture the second image associated with the second light in the dump path and provide second image data; and an electronic processor configured to process the second image data from the camera and the first image data associated with the first image associated with the first light in the projection path to determine an error, wherein the second image data from the camera is associated with the second light in the dump path captured the camera in the dump path, wherein the error is associated with operation of the matrix of reflective elements.

2. The HUD of claim 1, wherein the light processor comprises a matrix of micro-mirrors, wherein the second light in the dump path is an inverse to the first light in the projection path, wherein the electronic processor adds the second image data from the camera and the first image data associated with the first image associated with the first light in the projection path to form combined image data, wherein the first image data associated with the first light in the projection path is provided to the light processor to cause the first light to be provided to the projection path, wherein the electronic processor determines the error if the combined image data includes an inconsistency in intensity.

3. The HUD of claim 1, wherein the electronic processor compares an inverted image of one of the second image data from the camera and the first image data associated with the light in the projection path to the other of the second image data from the camera and the first image data associated with the first light in the projection path.

4. The HUD of claim 1, wherein the electronic processor combines the second image data from the camera and the first image data associated with the first light in the projection path to determine the error.

5. The HUD of claim 1, wherein the electronic processor blanks a display image if the error is present.

6. The HUD of claim 1 wherein the electronic processor blanks a portion of a display image associated with the error or provides indicia of an error at the portion of the display image.

7. The HUD of claim 1 wherein the projector comprises a prism and the dump path and the projection path at least partially traverse the prism.

8. The HUD of claim 1, wherein the projector is configured for use with a helmet mounted combiner, glass frame worn combiner, or a head worn combiner.

9. The HUD of claim 1 wherein the camera is focused to image a micro-mirror plane of the light processor.

10. A method of monitoring integrity of an image provided on a combiner of a head up display (HUD), the method comprising: providing light from a light processor to a dump path using a matrix of reflective elements configured to provide a first image to a projection path and a second image to the dump path, the first image and the second image being two dimensional images and being related; capturing the light in the dump path and providing second electronic image data associated with the second image using a first camera in the dump path; and using the second electronic image data to determine an error associated with the image provided on the combiner by comparing or combining first electronic image data associated with the first image and to the second electronic image data.

11. The method of claim 10, wherein the using the second electronic image data comprises combining the first electronic image data with the second electronic image data.

12. The method of claim 10, wherein the HUD is a head worn display (HWD), a fixed HUD, near eye display, a glass frame worn display or a helmet mounted display (HMD).

13. The method of claim 10, wherein the error is determined if a combination of the first electronic image data and the second electronic image data includes an inconsistency in intensity.

14. The method of claim 10, wherein the light provided to the dump path is provided by micro-mirrors in an off state, and wherein the second electronic image data is an inverse of the first electronic image data and the first electronic image data is provided to the light processor if there are no errors.

15. The method of claim 10, further comprising:
wherein the first electronic image data is provided by a second camera; and
using an alignment between the first camera and the second camera to determine the error.

16. In a head up display for providing symbology on a combiner, a method comprising: projecting first light to a combiner as a first image comprising the symbology and second light as a second image to a camera in a dump path in response to first electronic drive image data provided to a micro-mirror assembly; providing first camera image data in response to the second light provided to the camera; and processing the first camera image data and the first electronic drive image data to determine if there are any errors associated with projection of the first light from the micro-mirror assembly.

17. The method of claim 16, wherein the processing comprises combining the first camera image data and the first electronic drive image data, wherein a consistent intensity level indicates an absence of errors.

18. The method of claim 17, wherein the consistent intensity level is a full intensity level.

19. The method of claim 17, wherein the first camera image data is for a first color and the first electronic drive image data is for the first color and wherein the method further comprises: projecting second third light to the combiner and fourth light to the camera in response to second electronic drive image data for a second color provided to the micro-mirror assembly or another micro-mirror assembly; providing second camera image data for the second color in response to the fourth second light provided to the camera; and processing the second camera image data for the second color and the second electronic drive image data for the second color to determine another an error associated with the micro-mirror assembly.

20. The method of claim 19, further comprising: projecting fifth light to the combiner and sixth light to the camera in response to third electronic drive image data for a third color provided to the micro-mirror assembly or a different micro-mirror assembly; providing third camera image data for the third color in response to the sixth light provided to the camera; and processing the third camera image data for the third color and the third electronic drive image data for the third color to determine a further error associated with the micro-mirror assembly.

* * * * *